US009558577B2

(12) United States Patent
Hobbs et al.

(10) Patent No.: US 9,558,577 B2
(45) Date of Patent: Jan. 31, 2017

(54) RHYTHMIC MOSAIC GENERATION METHODS, APPARATUSES AND MEDIA

(71) Applicants: Rowland Hobbs, New York, NY (US); George Dy, Oakland, CA (US); Duke Sherman, New York, NY (US); David Sonnenberg, Tenafly, NJ (US)

(72) Inventors: Rowland Hobbs, New York, NY (US); George Dy, Oakland, CA (US); Duke Sherman, New York, NY (US); David Sonnenberg, Tenafly, NJ (US)

( * ) Notice: Subject to any disclaimer, the term of this patent is extended or adjusted under 35 U.S.C. 154(b) by 0 days.

(21) Appl. No.: 14/689,657

(22) Filed: Apr. 17, 2015

(65) Prior Publication Data
US 2015/0221117 A1 Aug. 6, 2015

Related U.S. Application Data

(63) Continuation-in-part of application No. PCT/US2013/065438, filed on Oct. 17, 2013, and a continuation-in-part of application No. 13/625,288, filed on Sep. 24, 2012, which is a continuation of application No. PCT/US2012/055261, filed on Sep. 14, 2012, application No. 14/689,657, which is a continuation-in-part of application No. 14/198,301, filed on Mar. 5, 2014, which is a continuation-in-part of application No. 29/412,733, filed on Feb. 7, 2012, now Pat. No. Des. 718,776, and a continuation-in-part of application No. 29/412,735, filed on Feb. 7, 2012, now Pat. No. Des. 718,777, and a continuation-in-part of application No. 29/412,736, filed on Feb. 7, 2012, now Pat. No. Des. 719,963, and a continuation-in-part of application No. 29/412,738, filed on Feb. 7, 2012, now Pat. No. Des. 719,964, and a continuation-in-part of application No. 29/412,739, filed on Feb. 7, 2012, (Continued)

(51) Int. Cl.
*G06K 9/36* (2006.01)
*G06T 11/60* (2006.01)

(52) U.S. Cl.
CPC ..................... *G06T 11/60* (2013.01)

(58) Field of Classification Search
CPC ...... G06K 9/6423; G06K 9/32; G06K 9/6407; G06K 9/686; G06T 7/001; G06T 11/60
See application file for complete search history.

(56) References Cited

U.S. PATENT DOCUMENTS 6,636,648 B2 10/2003 Loui
7,296,224 B2 11/2007 Atkins et al.
(Continued)

OTHER PUBLICATIONS

International Search Report, issued in related international application, PCT/US2012/055261, Dec. 20, 2012.
(Continued)

Primary Examiner — Amir Alavi
(74) Attorney, Agent, or Firm — Day Pitney LLP

(57) ABSTRACT

A request to generate templates for a template set may be received. A template set member from the template set may be selected and the template set member's dimensions may be determined based on an initial cut. A desired number of image tiles for the template set member may be identified, and templates having the desired number of image tiles may be generated for the template set member based on logical rules.

20 Claims, 6 Drawing Sheets

Related U.S. Application Data now Pat. No. Des. 718,778, application No. 14/689,657, which is a continuation-in-part of application No. 29/433,980, filed on Oct. 8, 2012, now abandoned, and a continuation-in-part of application No. 29/433,983, filed on Oct. 8, 2012, now abandoned, and a continuation-in-part of application No. 29/433,999, filed on Oct. 8, 2012, now abandoned, and a continuation-in-part of application No. 29/434,010, filed on Oct. 9, 2012, now abandoned, and a continuation-in-part of application No. 29/434,016, filed on Oct. 9, 2012, now abandoned, and a continuation-in-part of application No. 29/434,024, filed on Oct. 9, 2012, now abandoned, and a continuation-in-part of application No. 29/434,029, filed on Oct. 9, 2012, now abandoned, and a continuation-in-part of application No. 29/434,041, filed on Oct. 9, 2012, now abandoned, and a continuation-in-part of application No. 29/434,057, filed on Oct. 9, 2012, now abandoned, and a continuation-in-part of application No. 29/434,434, filed on Oct. 12, 2012, now abandoned, and a continuation-in-part of application No. 29/434,599, filed on Oct. 15, 2012, now abandoned, and a continuation-in-part of application No. 29/434,877, filed on Oct. 17, 2012, now abandoned, and a continuation-in-part of application No. 29/434,885, filed on Oct. 17, 2012, now abandoned, and a continuation-in-part of application No. 29/434,887, filed on Oct. 17, 2012, now abandoned, and a continuation-in-part of application No. 29/434,888, filed on Oct. 17, 2012, now abandoned, and a continuation-in-part of application No. 29/434,892, filed on Oct. 17, 2012, now abandoned, and a continuation-in-part of application No. 29/434,894, filed on Oct. 17, 2012, now abandoned, and a continuation-in-part of application No. 29/434,895, filed on Oct. 17, 2012, now abandoned.

(60) Provisional application No. 61/716,185, filed on Oct. 19, 2012, provisional application No. 61/671,405, filed on Jul. 13, 2012, provisional application No. 61/774,551, filed on Mar. 7, 2013.

(56) References Cited

U.S. PATENT DOCUMENTS

| | | | |
|---|---|---|---|
| 7,340,676 B2 | 3/2008 | Geigel et al. | |
| 7,411,578 B2 | 8/2008 | Shuhami | |
| 7,474,801 B2 | 1/2009 | Teo et al. | |
| 7,743,322 B2 | 6/2010 | Atkins | |
| 7,956,847 B2 | 6/2011 | Christie | |
| 8,064,710 B2 | 11/2011 | Mizoguchi | |
| 8,078,969 B2 | 12/2011 | Harrison | |
| 8,159,550 B2 | 4/2012 | Paine et al. | |
| 8,184,916 B2 | 5/2012 | Matraszek et al. | |
| 8,189,066 B2 | 5/2012 | Oota | |
| 8,189,880 B2 | 5/2012 | Wen et al. | |
| 8,212,834 B2 | 7/2012 | Bogart et al. | |
| 8,290,281 B2 | 10/2012 | Xiao | |
| 9,245,209 B2 * | 1/2016 | Eschbach | B31B 1/00 |
| 2002/0009229 A1 * | 1/2002 | Fu | G06K 9/46 382/199 |
| 2002/0189189 A1 | 12/2002 | Kupczyk | |
| 2003/0072486 A1 | 4/2003 | Loui et al. | |
| 2003/0187984 A1 | 10/2003 | Banavar et al. | |
| 2003/0231202 A1 | 12/2003 | Parker et al. | |
| 2005/0223347 A1 * | 10/2005 | Okuaki | G06F 17/5081 716/52 |
| 2008/0232697 A1 | 9/2008 | Chen et al. | |
| 2009/0083637 A1 | 3/2009 | Skakkebaek et al. | |
| 2010/0008570 A1 | 1/2010 | Urashima | |
| 2010/0043017 A1 | 2/2010 | Paul | |
| 2011/0129159 A1 | 6/2011 | Cifarelli | |
| 2012/0099156 A1 | 4/2012 | Chen | |
| 2012/0159314 A1 | 6/2012 | Schrier et al. | |
| 2013/0024757 A1 | 1/2013 | Doll et al. | |
| 2015/0039984 A1 * | 2/2015 | Asano | G06F 17/246 715/209 |
| 2015/0221117 A1 * | 8/2015 | Hobbs | G06T 11/60 382/284 |

OTHER PUBLICATIONS

Steve Bunting, DBB Kazaa Database File—1$^{st}$ 9 Fields plus Kazaa Hash Decoded, Dec. 2003.

G. Ponder, Instagram alternative EyeEm hits the Marketplace, published on Apr. 25, 2012 on the wpcentral.com website.

Tom Warren, Windows Phone 8 in detail: new Start Screen, multi-core support, VoIP integration, and NFC, published Jun. 20, 2012 on theverge.com.

Matthew Miller, Windows Phone 7 Companion, Nov. 2010, Wiley.

MG Siegler, Distilled from Burbn, Instagram Makes Quick Beautiful Photos Social, Sep. 2010.

https://itunes.apple.com/us/app/iphoto/id497786065?mt=8, iPhoto for iPhone 4, iPhone4S, iPhone 5, iPod touch (4$^{th}$ generation), iPod touch {5$^{th}$ ge . . . , downloaded on Nov. 28, 2012.

USPTO Non-Final Office Action, issued in related U.S. Appl. No. 14/198,301, Oct. 22, 2014.

USPTO Final Office Action, issued in related U.S. Appl. No. 14/198,301, Aug. 6, 2015.

International Preliminary Report on Patentability with Written Opinion, issued in related international application, PCT/US2012/055261, Jan. 13, 2015.

USPTO Non-Final Office Action, issued in related U.S. Appl. No. 13/625,288, Nov. 30, 2012.

USPTO Final Office Action, issued in related U.S. Appl. No. 13/625,288, Mar. 4, 2013.

USPTO Final Office Action, issued in related U.S. Appl. No. 13/625,288, Jun. 13, 2013.

USPTO Non-Final Office Action, issued in related U.S. Appl. No. 13/625,288, Jun. 26, 2013.

The Skinny. Instagram, Engauge, publication date unknown. URL: http://www.engauge.com/assets/pdf/EngaugeInstagram.pdf.

* cited by examiner

RHYTHMIC MOSAIC GENERATION METHODS, APPARATUSES AND MEDIA

CROSS-REFERENCE TO RELATED APPLICATIONS

This patent application is a continuation-in-part of and claims the benefit of priority to International Patent Application No. PCT/US13/65438, filed Oct. 17, 2013, which is turn claims the benefit of priority to U.S. provisional patent application No. 61/716,185, filed Oct. 19, 2012.

This patent application claims the benefit of priority to and is a continuation-in-part of U.S. patent application Ser. No. 13/625,288, filed Sep. 24, 2012, which in turn is a continuation of and claims the benefit of priority to International Patent Application No. PCT/US2012/55261, filed Sep. 14, 2012 and claims the benefit of priority to U.S. Provisional Patent Application Ser. No. 61/671,405, filed Jul. 13, 2012.

This patent application is a continuation-in-part of and claims the benefit of priority to U.S. patent application Ser. No. 14/198,301, filed Mar. 5, 2014, which in turn claims the benefit of priority to U.S. Provisional Patent Application Ser. No. 61/774,551, filed Mar. 7, 2013.

This patent application is a continuation-in-part of and claims the benefit of priority to U.S. patent application Ser. No. 14/198,301, filed Mar. 5, 2014, which in turn claims the benefit of priority to and is a continuation-in-part of U.S. patent application Ser. No. 29/412,733, filed Feb. 7, 2012, U.S. patent application Ser. No. 29/412,735, filed Feb. 7, 2012, U.S. patent application Ser. No. 29/412,736, filed Feb. 7, 2012, U.S. patent application Ser. No. 29/412,738, filed Feb. 7, 2012, and U.S. patent application Ser. No. 29/412,739, filed Feb. 7, 2012. The present application is also related to U.S. Provisional Application Ser. No. 61/693,358, filed Aug. 27, 2012.

This patent application is a continuation-in-part of and claims the benefit of priority to U.S. patent application Ser. No. 29/433,980, filed Oct. 8, 2012, U.S. patent application Ser. No. 29/433,983, filed Oct. 8, 2012, U.S. patent application Ser. No. 29/433,999, filed Oct. 8, 2012, U.S. patent application Ser. No. 29/434,010, filed Oct. 9, 2012, U.S. patent application Ser. No. 29/434,016, filed Oct. 9, 2012, U.S. patent application Ser. No. 29/434,024, filed Oct. 9, 2012, U.S. patent application Ser. No. 29/434,029, filed Oct. 9, 2012, U.S. patent application Ser. No. 29/434,041, filed Oct. 9, 2012, U.S. patent application Ser. No. 29/434,057, filed Oct. 9, 2012, U.S. patent application Ser. No. 29/434,434, filed Oct. 12, 2012, U.S. patent application Ser. No. 29/434,599, filed Oct. 15, 2012, U.S. patent application Ser. No. 29/434,877, filed Oct. 17, 2012, U.S. patent application Ser. No. 29/434,885, filed Oct. 17, 2012, U.S. patent application Ser. No. 29/434,887, filed Oct. 17, 2012, U.S. patent application Ser. No. 29/434,888, filed Oct. 17, 2012, U.S. patent application Ser. No. 29/434,892, filed Oct. 17, 2012, U.S. patent application Ser. No. 29/434,894, filed Oct. 17, 2012, U.S. patent application Ser. No. 29/434,895, filed Oct. 17, 2012.

This disclosure descrives RHYTHMIC MOSAIC GENERATION METHODS, APPARATUSES AND MEDIA (hereinafter "RMG"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

The content of each of the aforementioned patent applications is expressly incorporated by reference in its entirety for any purpose whatsoever.

FIELD

The present disclosure is directed generally to digital picture management platforms.

BACKGROUND

With the advent of digital cameras and their inclusion in smart phones, tablets, laptops and other portable electronic devices, it has become easier than ever for people to take photos. Some people choose to print out their digital photos, while others choose to view their digital photos on screens of their portable electronic devices, computer monitors or big screen TVs.

BRIEF DESCRIPTION OF THE FIGURES

The accompanying figures and/or appendices illustrate various exemplary embodiments in accordance with the present disclosure.

DETAILED DESCRIPTION

Introduction

Figure 1:
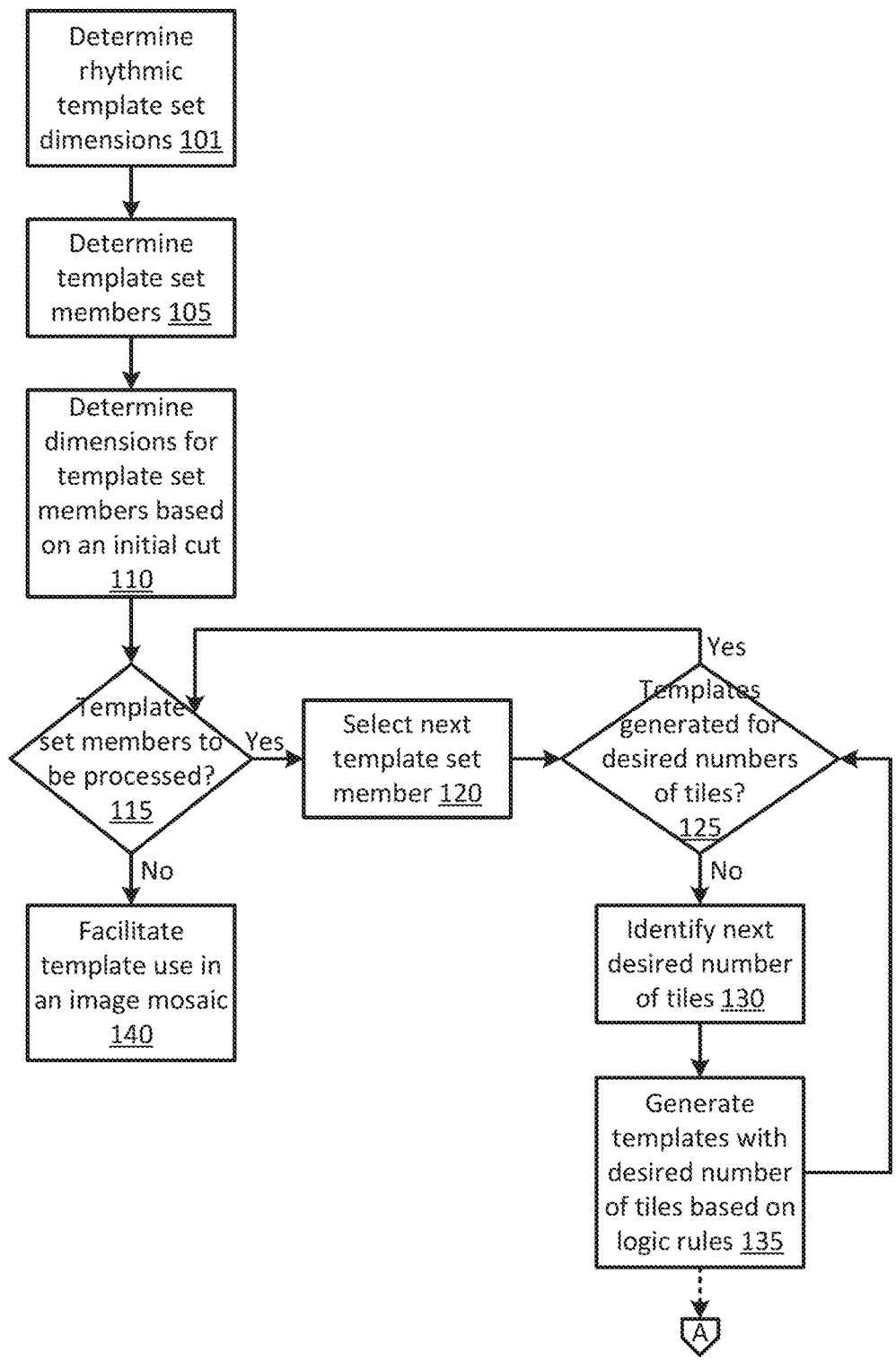
FIG. 1 shows a logic flow diagram illustrating an exemplary template generating (TG) component in one embodiment of the RMG.

The RMG facilitates generation of templates for use in aesthetically balanced rhythmic image mosaics. A mosaic may be a group of images positioned in image tiles of one or more templates (e.g., in accordance with an optimal template configuration and/or aesthetic balance). The templates may be tailored to deliver a pleasing mobile photo browsing experience. In one embodiment, templates in a mosaic may be configured to create an inclination for a user to scroll the mosaic from a first direction to a second direction (e.g., from left to right, from top to bottom). In another embodiment, templates in a mosaic may be configured to create a rhythmic flow of narrow and wide templates that accommodates the right balance of portrait and landscape pictures, maintains visual interest in a systematic way, and ensures consistent and balanced sizing of pictures within and between the templates.

The present disclosure is directed in some aspects to a processor-implemented method to facilitate template generation. An illustrative method includes receiving via a processor a request to generate templates for a template set, selecting via the processor a template set member from the template set, determining via the processor dimensions of the template set member based on an initial cut, identifying via the processor a desired number of image tiles for the template set member, and generating via the processor templates having the desired number of image tiles for the template set member based on logical rules.

In accordance with further aspects, generating via the processor templates having the desired number of image tiles can further include (a) selecting an image tile of a template that is being generated, (b) confirming that the image tile may be subdivided, (c) determining a tile type associated with the image tile, (d) subdividing the image tile into a plurality of tiles in accordance with the tile type and the initial cut, and (e) repeating (a) through (d) until the template has the desired number of image tiles. The tile type can be one of Horizontal, Square, and Vertical. The selected image tile can be randomly selected, can be the biggest or the smallest image tile of the template, can be the topmost or the bottommost image tile of the template, and/or the like. Confirming that the image tile may be subdivided can include verifying that the template would have a focal picture after the image tile is subdivided, can include verifying that the image tile's aspect ratio substantially corresponds to one of allowed aspect ratios, can include verifying that the image tile's size is at least a minimum specified size, and/or the like. Subdividing the image tile into a plurality of tiles can include subdividing the image tile using at least one horizontal cut, can include subdividing the image tile using at least one vertical cut, can include subdividing the image tile using at least one vertical cut and at least one horizontal cut, can include subdividing the image tile in accordance with emphasis specification, can include subdividing the image tile in such a way as to avoid creating a duplicate template, and/or the like.

In accordance with a further aspect, the template set can comprise a wide template set member and a narrow template set member, and the initial cut can be such that the width of the wide template set member substantially corresponds to 62% of the template set width and the width of the narrow template set member substantially corresponds to 38% of the template set width.

In accordance with a further aspect, the method can include generating an image mosaic by repeatedly using the generated templates in accordance with the template set setup. Dimensions of the template set can be such that the template set is larger than the screen size of a client device, on which the image mosaic is to be viewed, by a predetermined amount.

In accordance with a further aspect, the desired number of image tiles for the template set member can be a plurality of desired numbers between a minimum number and a maximum number.

The disclosure further provides a template generating apparatus having a memory, a processor in communication with the memory, and configured to issue a plurality of processing instructions stored in the memory, wherein the processor issues instructions to receive a request to generate templates for a template set, select a template set member from the template set, determine dimensions of the template set member based on an initial cut, identify a desired number of image tiles for the template set member, and generate templates having the desired number of image tiles for the template set member based on logical rules.

In accordance with further aspects, the processor issuable instructions to generate templates having the desired number of image tiles can further include instructions to (a) select an image tile of a template that is being generated, (b) confirm that the image tile may be subdivided, (c) determine a tile type associated with the image tile, (d) subdivide the image tile into a plurality of tiles in accordance with the tile type and the initial cut, and (e) repeat (a) through (d) until the template has the desired number of image tiles. The tile type can be one of Horizontal, Square, and Vertical. The selected image tile can be randomly selected, can be the biggest or the smallest image tile of the template, can be the topmost or the bottommost image tile of the template, and/or the like. The processor issuable instructions to confirm that the image tile may be subdivided can include instructions to verify that the template would have a focal picture after the image tile is subdivided, can include instructions to verify that the image tile's aspect ratio substantially corresponds to one of allowed aspect ratios, can include instructions to verify that the image tile's size is at least a minimum specified size, and/or the like. The processor issuable instructions to subdivide the image tile into a plurality of tiles can include instructions to subdivide the image tile using at least one horizontal cut, can include instructions to subdivide the image tile using at least one vertical cut, can include instructions to subdivide the image tile using at least one vertical cut and at least one horizontal cut, can include instructions to subdivide the image tile in accordance with emphasis specification, can include instructions to subdivide the image tile in such a way as to avoid creating a duplicate template, and/or the like.

In accordance with a further aspect, the processor can issue instructions to generate an image mosaic by repeatedly using the generated templates in accordance with the template set setup. Dimensions of the template set can be such that the template set is larger than the screen size of a client device, on which the image mosaic is to be viewed, by a predetermined amount.

The disclosure further provides a template generating processor-readable non-transitory physical medium storing processor-issuable instructions to receive a request to generate templates for a template set, select a template set member from the template set, determine dimensions of the template set member based on an initial cut, identify a desired number of image tiles for the template set member, and generate templates having the desired number of image tiles for the template set member based on logical rules.

In accordance with further aspects, instructions stored on the template generating processor-readable non-transitory physical medium to generate templates having the desired number of image tiles can further include instructions to (a) select an image tile of a template that is being generated, (b) confirm that the image tile may be subdivided, (c) determine a tile type associated with the image tile, (d) subdivide the image tile into a plurality of tiles in accordance with the tile type and the initial cut, and (e) repeat (a) through (d) until the template has the desired number of image tiles. The tile type can be one of Horizontal, Square, and Vertical. The selected image tile can be randomly selected, can be the biggest or the smallest image tile of the template, can be the topmost or the bottommost image tile of the template, and/or the like. Instructions stored on the template generating processor-readable non-transitory physical medium to confirm that the image tile may be subdivided can include instructions to verify that the template would have a focal picture after the image tile is subdivided, can include instructions to verify that the image tile's aspect ratio substantially corresponds to one of allowed aspect ratios, can include instructions to verify that the image tile's size is at least a minimum specified size, and/or the like. Instructions stored on the template generating processor-readable non-transitory physical medium to subdivide the image tile into a plurality of tiles can include instructions to subdivide the image tile using at least one horizontal cut, can include instructions to subdivide the image tile using at least one vertical cut, can include instructions to subdivide the image tile using at least one vertical cut and at least one horizontal cut, can include instructions to subdivide the image tile in accordance with emphasis specification, can include instructions to subdivide the image tile in such a way as to avoid creating a duplicate template, and/or the like.

In accordance with a further aspect, the template generating processor-readable non-transitory physical medium can include instructions to generate an image mosaic by repeatedly using the generated templates in accordance with the template set setup. Dimensions of the template set can be such that the template set is larger than the screen size of a client device, on which the image mosaic is to be viewed, by a predetermined amount.

DETAILED DESCRIPTION OF THE RMG

FIG. 1 shows a logic flow diagram illustrating an exemplary template generating (TG) component in one embodiment of the RMG. In FIG. 1, rhythmic template set dimensions may be determined at 101. For example, the rhythmic template set dimensions may be specified by a user requesting the RMG to generate templates for the rhythmic template set. These dimensions may be determined by parsing (e.g., using Perl) the user's request. In another example, the rhythmic template set dimensions may be predetermined (e.g., stored in a configuration file, stored in a database) and may be retrieved from the template sets data store 530e using one or more SQL queries substantially in the following form:
  SELECT TemplateSetDimensions
  FROM TemplateSets
  WHERE TemplateSetID="identifier of the template set"
A rhythmic template set may comprise one or more (e.g., two) template types (e.g., a wide template type followed by a narrow template type). In one embodiment, the dimensions (e.g., width and/or height of the rectangle formed by the rhythmic template set) of the rhythmic template set may be specified such that the rhythmic template set is larger than the screen size of a client device on which the mosaic may be viewed by a predetermined amount. In one implementation, the width (or height) of the rhythmic template set may be between 0% and 5% larger than the width (or height) of the client's screen. In another implementation, the width (or height) of the rhythmic template set may be between 5% and 10% larger than the width (or height) of the client's screen. In yet another implementation, the width (or height) of the rhythmic template set may be between 10% and 15% larger than the width (or height) of the client's screen. Making the width (or height) of the rhythmic template set larger than the client's screen width may give a viewer of a mosaic a motivation to scroll the mosaic (e.g., from left to right, from top to bottom). For example, if the viewer will view the mosaic on an iPad with a 4:3 screen aspect ratio, the rhythmic template set may form a rectangle whose dimensions substantially correspond to dimensions of a Golden Rectangle (i.e., having a width to height ratio of approximately 1.618 to 1) and whose width exceeds the width of the iPad's screen by approximately 7%. Throughout this disclosure an aspect ratio or a dimension "substantially corresponds" if it corresponds to within a specified percentage. In one implementation, this percentage may be between 0% and 5%. In another implementation, this percentage may be between 5% and 10%. In yet another implementation, this percentage may be between 10% and 15%.

Members of the rhythmic template set may be determined at 105. In one embodiment, members of the rhythmic template set may comprise a wide template type and a narrow template type (e.g., a wide rectangular template and a narrow rectangular template). For example, members of the rhythmic template set may be determined based on data in the template sets data store 530e using one or more SQL queries substantially in the following form:
  SELECT TemplateSetMembers, TemplateSetMembersOrder
  FROM TemplateSets
  WHERE TemplateSetID="identifier of the template set"
In one implementation, a mosaic generated in accordance with the rhythmic template set setup may be restricted to using template set members in the order specified by the rhythmic template set (e.g., a wide template followed by a narrow template). In another implementation, a mosaic generated in accordance with the rhythmic template set setup may use template set members in any desired order (e.g., a wide template followed by a narrow template, or a narrow template followed by a wide template). In other embodiments, different types and/or numbers of members may be used.

The dimensions of the rhythmic template set members may be determined at 110. In one embodiment, the dimensions of the members may be determined based on an initial cut (e.g., specified by the user, determined based on data stored in a data store). In one implementation, the initial cut may be specified as percentages of the rhythmic template set width (e.g., for a horizontally oriented rhythmic template set) or rhythmic template set height (e.g., for a vertically oriented rhythmic template set) allotted to each rhythmic template set member. Such percentages may be specified using numbers (e.g., 62% and 38%), using a marker drawn by the user utilizing the GUI of the RMG (e.g., a vertical line that divides a horizontally oriented rectangular rhythmic template set into two template set members), and/or the like. For example, an initial vertical cut of a horizontally oriented rectangular rhythmic template set comprising a wide rectangular template set member followed by a narrow rectangular template set member may be made such that the width of the wide member substantially corresponds to 62% of the overall width and the width of the narrow member substantially corresponds to 38% of the overall width. In the case of a horizontally oriented rectangular template set whose dimensions substantially correspond to dimensions of a Golden Rectangle, such a division would create a wide template set member whose dimensions substantially correspond to a square and a narrow template set member whose dimensions substantially correspond to a vertically oriented Golden Rectangle. Similarly, an initial horizontal cut may be made in an analogous manner in the case of a vertically oriented rectangular rhythmic template set comprising a wide rectangular template set member followed by a narrow rectangular template set member.

A determination may be made at 115, whether there remain template set members for which templates should be generated. Templates may be generated for each template set member (e.g., for a wide member and for a narrow member). A template may be one or more image tiles arranged in a configuration (e.g., a template may comprise a single rectangular image tile, two identically sized horizontally oriented rectangular image tiles one on top of another, and/or the like).

If there remain template set members for which templates should be generated, the next template set member to be processed may be selected at 120. A determination may be made at 125, whether templates have been generated for the selected template set member for each desired number of image tiles. In one embodiment, a minimum and/or maximum number of image tiles may be desired (e.g., for each template set member, for the template set). For example, it may be desired for the wide member to have up to three image tiles and for the narrow member to have up to four image tiles. Accordingly, templates having between one and three image tiles may be generated for the wide member and templates having between one and four image tiles may be generated for the narrow member.

If templates have not been generated for each desired number of image tiles, the next desired number of image tiles may be identified at 130 (e.g., using a C++ for loop to iterate through the desired numbers of tiles). Templates with the identified number of images tiles may be generated at 135 in accordance with logic rules. For example, the logic rules may be stored in the logic rules data store 530c. See FIG. 2 for additional details regarding how the templates are generated. For example, template data may be stored in the templates data store 530d.

If templates have been generated for each desired number of image tiles, a determination may be made whether there remain template set members for which templates should be generated at 115. If templates have been generated for each template set member, the RMG may facilitate template use in an image mosaic. See FIGS. 4A and 4B for examples of wide and narrow templates that may have been generated by the RMG. In one embodiment, the RMG may generate an aesthetically balanced rhythmic image mosaic by repeatedly using the generated templates in accordance with the rhythmic template set setup (e.g., repeatedly using sets comprising a wide template and a narrow template). For example, the RMG may repeatedly use sets comprising a wide template followed by a narrow template. In another example, the RMG may repeatedly use sets comprising a wide template and a narrow template in any order (e.g., wide template, narrow template, narrow template, wide template). In another embodiment, the RMG may facilitate mosaic editing by a user by facilitating user replacement of one template generated for a set member with another template generated for the set member. For example, the user may replace one wide template with another wide template. In another example, the user may "flip" the order of template set members in any template set instance in a mosaic. In yet another embodiment, utilizing the rhythmic template set setup to create an image mosaic may facilitate printing of the image mosaic by ensuring a consistent image size (e.g., the size of the template set) for each printed page.

Figure 2:
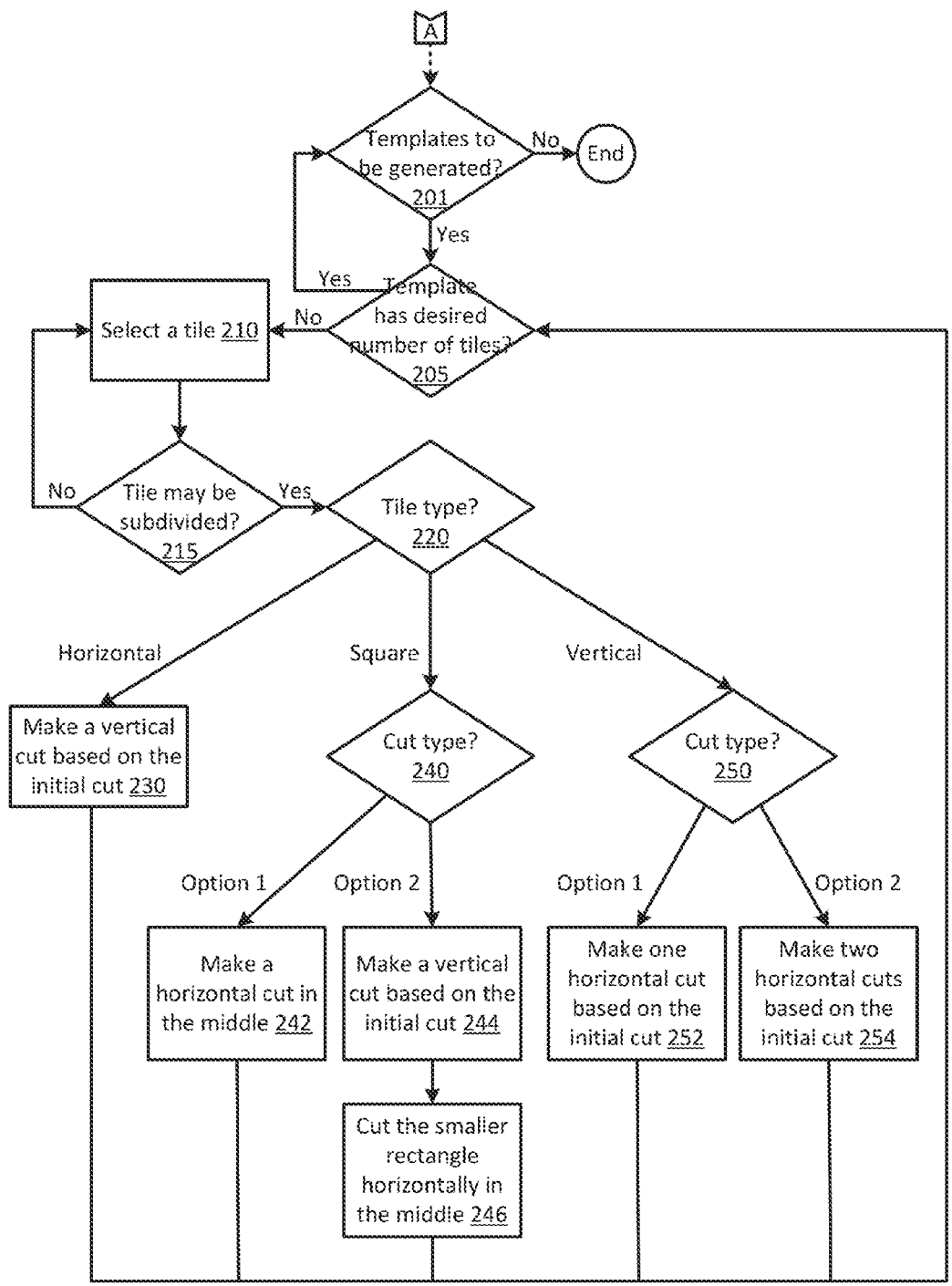
FIG. 2 shows a diagram illustrating exemplary template generation logic in one embodiment of the RMG.

FIG. 2 shows a diagram illustrating exemplary template generation logic in one embodiment of the RMG. In FIG. 2, a determination may be made at 201 whether there remain templates to be generated having the desired number of image tiles. In one embodiment, each allowed template configuration may be generated. In another embodiment, a maximum number of desired templates may be specified.

If more templates having the desired number of image tiles should be generated, a new template may be created and a determination may be made at 205 whether the template has the desired number of image tiles. For example, a newly created template may have one initial image tile having dimensions of the entire template. In another example, a template in which an image tile has been subdivided may have two or more image tiles. If the template already has the desired number of image tiles, the template may be stored in the templates data store 530d using one or more SQL queries substantially in the following form:

INSERT INTO Templates (TemplateID, TemplateTiles)
VALUES (ID_Template, sizes and position of image tiles)

If the template does not yet have the desired number of image tiles, an image tile may be selected for subdivision at 210. The image tile selected for subdivision may be determined in various ways. In one embodiment, an image tile may be selected randomly. In another embodiment, the biggest (e.g., based on width, based on height, based on area) or the smallest image tile may be selected. In yet another embodiment, the topmost or the bottommost image tile may be selected. In yet another embodiment, the leftmost or the rightmost image tile may be selected.

A determination may be made at 215 whether the selected image tile may be subdivided. For example, logic rules that determine whether the selected image tile may be subdivided may be retrieved from the logic rules data store 530c. In one embodiment, an image tile may not be subdivided if it is less than a minimum size (e.g., based on width, based on height, based on area). For example, the minimum size may be specified as a number of pixels, as a percentage of the screen size, as an aspect ratio, and/or the like. In another embodiment, an image tile may not be subdivided if the current template set member should have a focal picture (e.g., a picture whose area is at least 30% of the overall template set area) and subdividing the image tile would violate this condition. For example, the user may specify that the current template set member should have at least one focal picture. In yet another embodiment, an image tile may not be subdivided unless its aspect ratio substantially corresponds to one of the allowed aspect ratios. In one implementation, allowed aspect ratios may include those of a square (i.e., aspect ratio of 1 to 1), a Golden Rectangle (i.e., aspect ratio of approximately 1.618 to 1), and a Landscape Rectangle (i.e., aspect ratio of 2 to 1). If the selected image tile may not be subdivided, a different image tile may be selected at 210.

If the selected image tile may be subdivided, a determination may be made at 220 regarding the type of the image tile, and the image tile may be subdivided using one or more cuts appropriate for the image tile's type. For example, logic rules that determine available types of image tiles and/or cuts appropriate for each type of image tile may be retrieved from the logic rules data store 530c. The dividing cuts (e.g., including the choice of where to make the initial cut) may be made in accordance with a 'harmonizing' principle to ensure that the corners of adjacent pictures meet at strict proportions along the edge of the pictures. In one embodiment, image tile types may include Horizontal (i.e., an image tile whose dimensions substantially correspond to those of a horizontally oriented rectangle), Square (i.e., an image tile whose dimensions substantially correspond to those of a square), and Vertical (i.e., an image tile whose dimensions substantially correspond to those of a vertically oriented rectangle). The image tile's type may be determined by analyzing the dimensions of the image tile. For example, if the dimensions of the image tile substantially correspond to those of a square, the image tile's type may be set as Square, otherwise, the image tile's type may be set as Horizontal (e.g., if the image tile's width exceeds its height) or Vertical (e.g., if the image tile's height exceeds its width). While the cuts described below may be used with template set members of a horizontally oriented rectangular rhythmic template set having an initial vertical cut, analogous cuts may be used with template set members of a vertically oriented rectangular rhythmic template set having an initial horizontal cut.

If the selected image tile's type is Horizontal, the image tile may be subdivided at 230 using a vertical cut based on the initial cut. Accordingly, if the initial cut was made such that the width of the wide template set member substantially corresponds to 62% of the template set's overall width and the width of the narrow template set member substantially corresponds to 38% of the template set's overall width, the image tile may be subdivided into two image tiles whose widths substantially correspond to 62% and 38% of the image tile's overall width. In one implementation, the determination as to which of the new image tiles should be wide and which should be narrow, may be made so as to correspond with the initial cut. For example, if the wide template set member was on the left, the new wide image should be on the left. In another implementation, the determination as to which of the new image tiles should be wide and which should be narrow, may be made randomly. In yet another implementation, the determination as to which of the new image tiles should be wide and which should be narrow, may be made based on emphasis specification. For example, if the user specifies that there should be emphasis on the right (e.g., for the current template set member), the image tile may be subdivided such that the narrow image tile is on the right. Once the selected image tile is subdivided, a determination may be made at 205 whether the template has the desired number of image tiles.

If the selected image tile's type is Square, a determination may be made at 240 regarding which type of cut to make. In one embodiment, the determination as to which type of cut to make may be made randomly. In another embodiment, the determination as to which type of cut to make may be made so as to avoid repetition (e.g., so as to avoid creating a duplicate template). In one embodiment, the image tile may be subdivided at 242 using a horizontal cut in the middle. Accordingly, the image tile may be subdivided into two rectangles whose dimensions substantially correspond to those of a Landscape Rectangle. In another embodiment, the image tile may be subdivided at 244 using a vertical cut based on the initial cut (e.g., in a similar manner as described with regard to 230), and the narrower of the two resulting rectangles may be further subdivided at 246 using a horizontal cut in the middle. The image tile may not be subdivided in this way if the number of resulting image tiles would exceed the desired number of image tiles for the template. Once the selected image tile is subdivided, a determination may be made at 205 whether the template has the desired number of image tiles.

If the selected image tile's type is Vertical, a determination may be made at 250 regarding which type of cut to make. In one embodiment, the determination as to which type of cut to make may be made randomly. In another embodiment, the determination as to which type of cut to make may be made so as to avoid repetition (e.g., so as to avoid creating a duplicate template). The image tile may be subdivided at 252 using a horizontal cut based on the initial cut. In one embodiment, if the initial cut was made such that the width of the wide template set member substantially corresponds to 62% of the template set's overall width and the width of the narrow template set member substantially corresponds to 38% of the template set's overall width, the image tile may be subdivided into two image tiles whose heights substantially correspond to 62% and 38% of the image tile's overall height. In another embodiment, the image tile may be subdivided such that the aspect ratio of the new narrow image tile substantially corresponds to the aspect ratios of the two horizontal rectangles that may be created at 242. In one implementation, the determination as to which of the new image tiles should be wide and which should be narrow, may be made randomly. In another implementation, the determination as to which of the new image tiles should be wide and which should be narrow, may be made based on emphasis specification. For example, if the user specifies that there should be emphasis at the top (e.g., for the current template set member), the image tile may be subdivided such that the narrow image tile is at the top. Alternatively, the image tile may be subdivided at 254 using two horizontal cuts based on the initial cut. The image tile may not be subdivided in this way if the number of resulting image tiles would exceed the desired number of image tiles for the template. In one embodiment, if the initial cut was made such that the width of the wide template set member substantially corresponds to 62% of the template set's overall width and the width of the narrow template set member substantially corresponds to 38% of the template set's overall width, the image tile may be subdivided into three image tiles such that the heights of each of the two image tiles at the top and bottom substantially correspond to 38% of the image tile's overall height. In another embodiment, the image tile may be subdivided such that the aspect ratios of the two new image tiles at the top and bottom substantially correspond to the aspect ratios of the two horizontal rectangles that may be created at 242. For example, if a rectangle whose dimensions substantially correspond to a vertically oriented Golden Rectangle is subdivided in such a way, the dimensions of the two rectangles at the top and bottom would substantially correspond to those of a Landscape Rectangle and the dimensions of the rectangle in the middle would substantially correspond to those of a Golden Rectangle. Once the selected image tile is subdivided, a determination may be made at 205 whether the template has the desired number of image tiles.

If the template has the desired number of image tiles, a determination may be made at 201 whether there remain templates to be generated having the desired number of image tiles. If no further templates should be generated, template generation ends.

Figure 3:
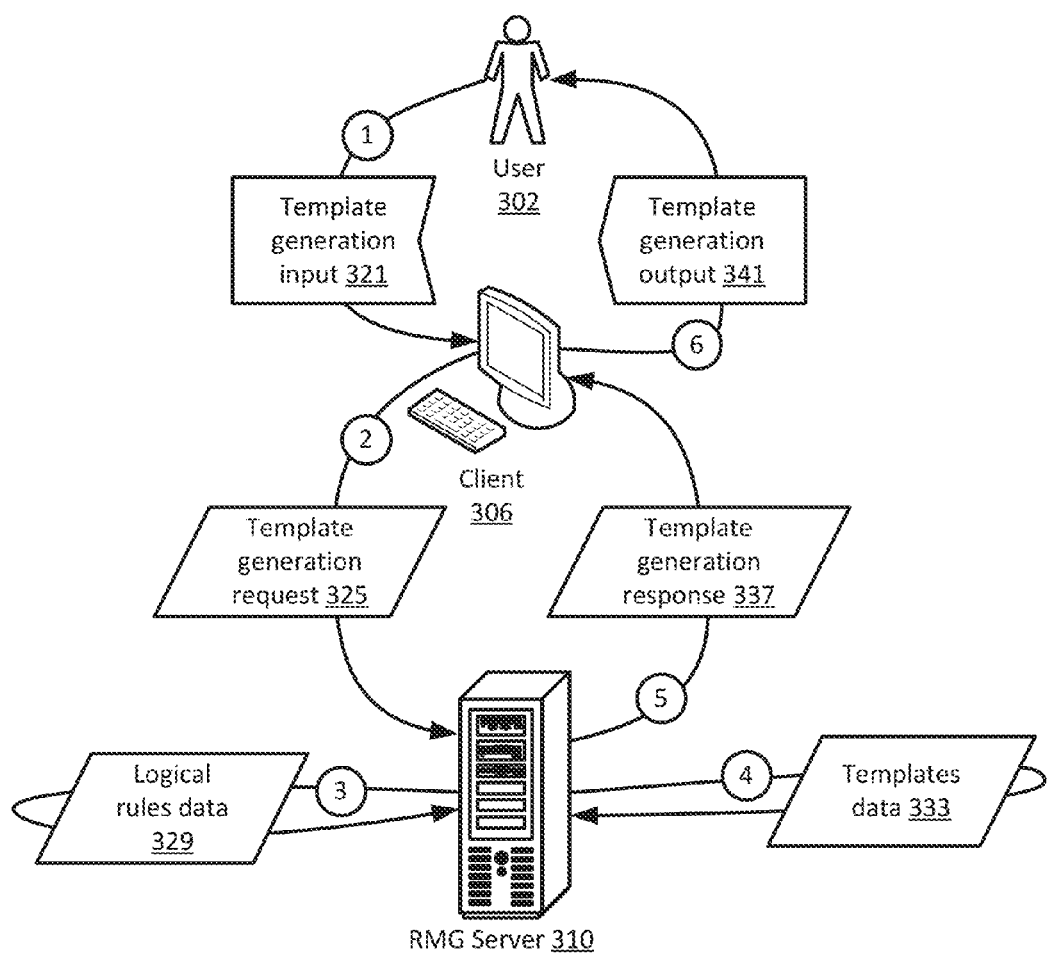
FIG. 3 shows a data flow diagram in one embodiment of the RMG.

FIG. 3 shows a data flow diagram in one embodiment of the RMG. FIG. 3 provides an example of how data may flow to, through, and/or from the RMG. In FIG. 3, a user 302 may send a template generation input 321 to a RMG client 306. For example, the user may use a keyboard and/or a mouse of the RMG client to request that the RMG generate templates. The user may utilize a GUI of the RMG to specify parameters such as the aspect ratio of the target screen, the position of the initial cut, a maximum number of image tiles for a template set member, a minimum image tile size, emphasis, and/or the like.

The RMG client may send a template generation request 325 to a RMG server 310. For example, the template generation request may include data such as the user's unique identifier, parameters specified by the user, and/or the like. In one implementation, the template generation request may be in XML format substantially in the following form:

```
<XML>
    <TemplateGenerationRequest>
        <UserID>ID_User</UserID>
        <ScreenAspectRatio>4:3</ScreenAspectRatio>
        <InitialCut>62% to 38%</InitialCut>
        <MaximumTiles>
            <WideMember>3</WideMember>
            <NarrowMember>4</NarrowMember>
        </MaximumTiles>
        <MinimumTileSize>
            <Width>10% of template set width</Width>
            <Height>10% of template set height</Height>
        </MinimumTileSize>
```

-continued

```
    <NumberOfFocalPictures>
        <WideMember>1</WideMember>
        <NarrowMember>0</NarrowMember>
    </NumberOfFocalPictures>
    <Emphasis>Top, Right</Emphasis>
    </TemplateGenerationRequest>
</XML>
```

The RMG server may analyze logic rules data 329 and/or templates data 333 to facilitate execution of the template generation request. For example, analyzed logic rules data may include logic rules specifications, user provided parameters, and/or the like. For example, analyzed templates data may include template shape, template orientation, template set members, generated templates, and/or the like.

The RMG server may send a template generation response 337 to the RMG client. For example, the template generation response may include data such as a confirmation that templates have been generated, a set of templates generated in response to the template generation request, and/or the like. In one implementation, the template generation response may be in XML format substantially in the following form:

```
<XML>
    <TemplateGenerationResponse>
        <Status>Success</Status>
        <Templates>
            <WideMember>
                <Template>TemplateData</Template>
                ...
                <Template>TemplateData</Template>
            </WideMember>
            <NarrowMember>
                <Template>TemplateData</Template>
                ...
                <Template>TemplateData</Template>
            </NarrowMember>
        </Templates>
    </TemplateGenerationResponse>
</XML>
```

The RMG client may display a template generation output 341 to the user. For example, the RMG client may display the confirmation (e.g., template generation status is "success"), the generated templates (e.g., the RMG may facilitate using the generated templates to create image mosaics), and/or the like.

Figure 4A:
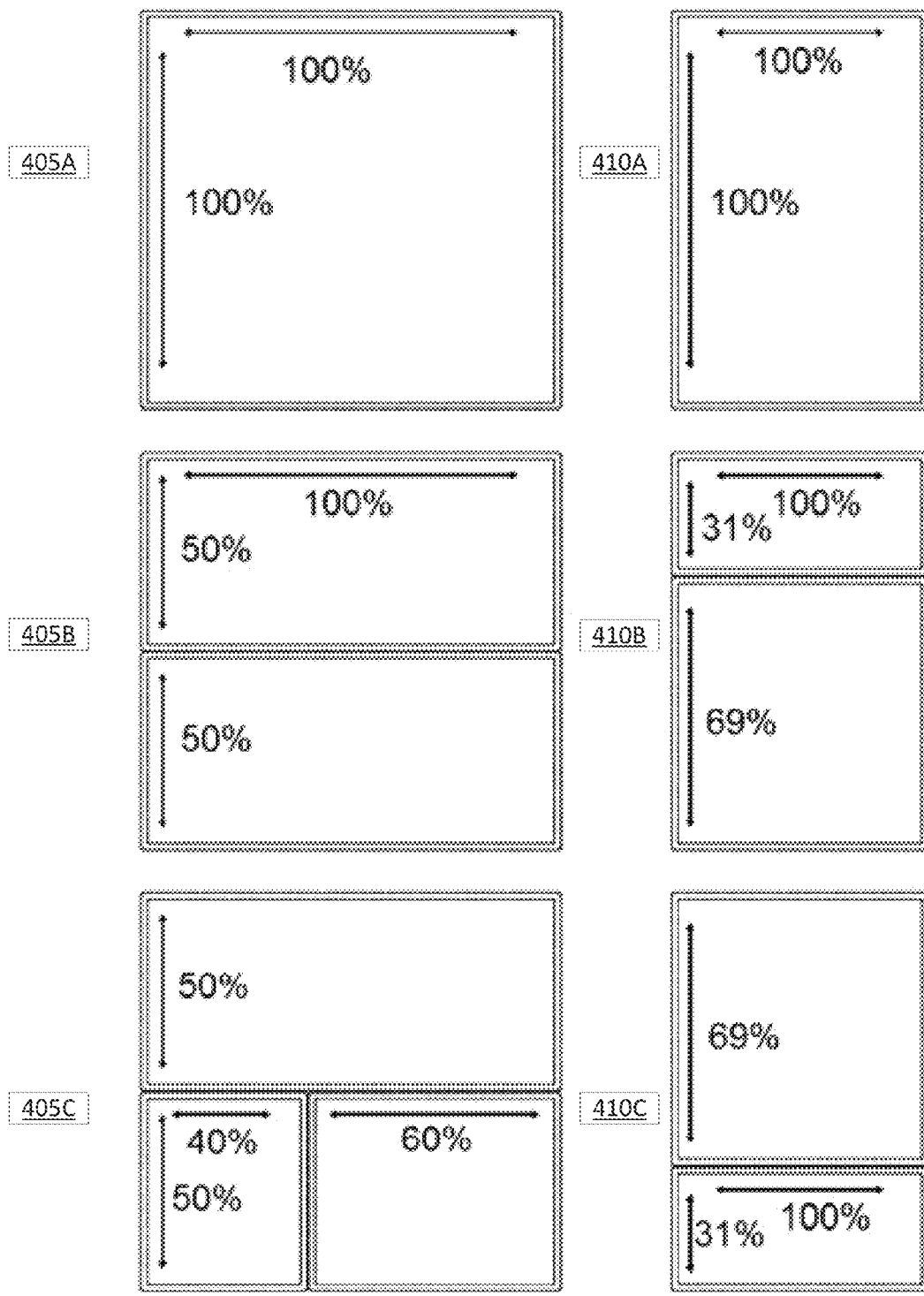
FIGS. 4A and 4B illustrate exemplary RMG templates in one embodiment of the RMG.
Figure 4B:
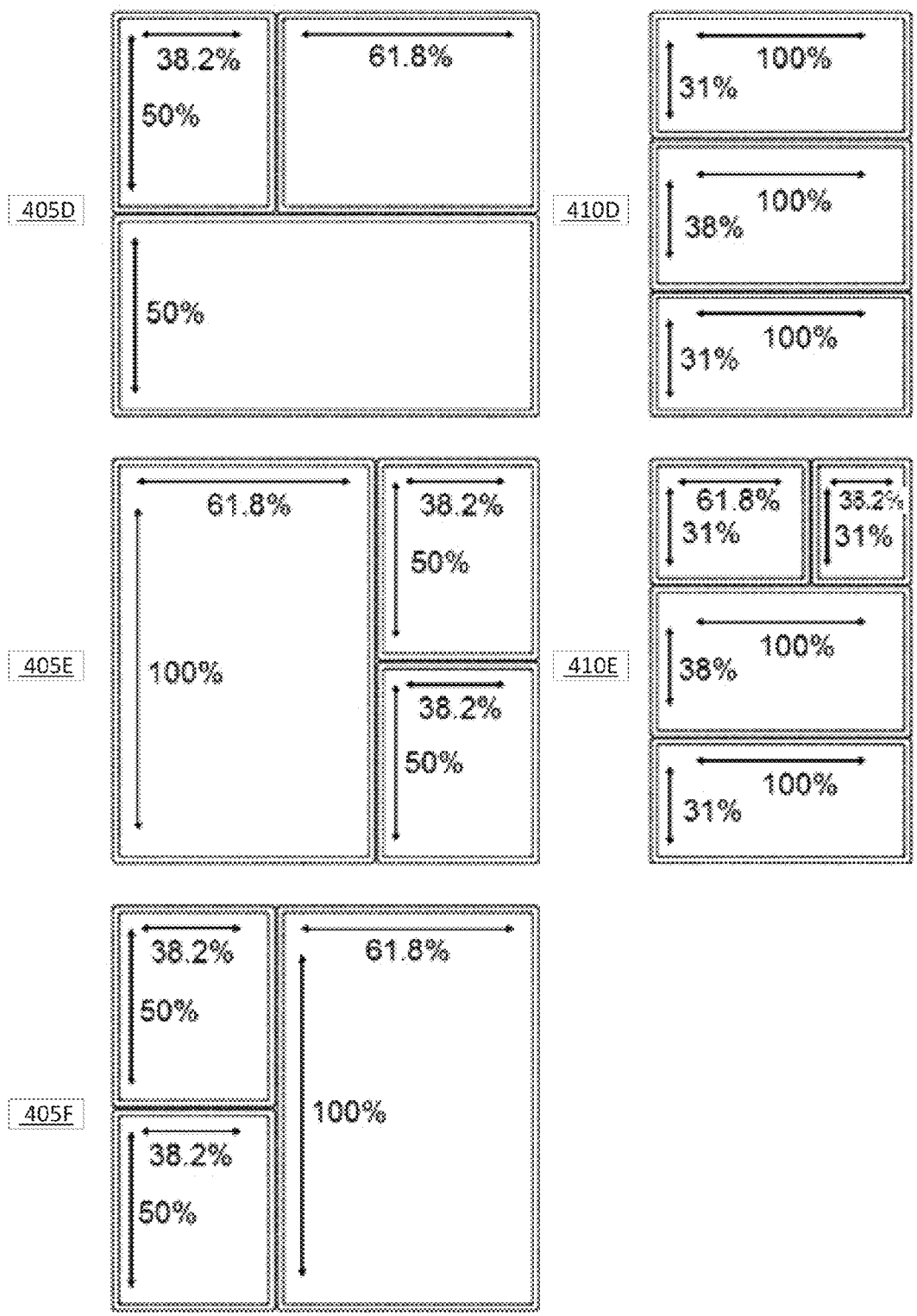

FIGS. 4A and 4B illustrate exemplary RMG templates in one embodiment of the RMG. FIGS. 4A and 4B show examples of wide templates 405A-405F and narrow templates 410A-410E that may have been generated by the RMG using a variety of cuts. In FIGS. 4A and 4B, templates generated for each template set member of a horizontally oriented rectangular rhythmic template set, whose dimensions substantially correspond to dimensions of a Golden Rectangle, comprising a wide rectangular template set member followed by a narrow rectangular template set member are shown. The initial vertical cut was such that the width of the wide member substantially corresponds to 62% of the overall width and the width of the narrow member substantially corresponds to 38% of the overall width. Accordingly, such a division created a wide template set member whose dimensions substantially correspond to a square and a narrow template set member whose dimensions substantially correspond to a vertically oriented Golden Rectangle. For example, the user may have requested six templates having between one and three image tiles for the wide rectangular template set member and five templates having between one and four image tiles for the narrow rectangular template set member.

Template 405A is a wide template with a single image tile. This image tile's type would be Square. Template 405B may be created by subdividing a Square image tile as shown in template 405A using a horizontal cut in the middle, as discussed with regard to 242. Template 405C may be created by subdividing the lower Horizontal image tile as shown in template 405B using a vertical cut, as discussed with regard to 230. Template 405D may be created by subdividing the upper Horizontal image tile as shown in template 405B using a vertical cut, as discussed with regard to 230. Template 405E may be created by subdividing a Square image tile as shown in template 405A using a vertical cut, such that the narrower of the two resulting rectangles is on the right, and by subdividing the narrower rectangle using a horizontal cut, as discussed with regard to 244-246. Template 405F may be created by subdividing a Square image tile as shown in template 405A using a vertical cut, such that the narrower of the two resulting rectangles is on the left, and by subdividing the narrower rectangle using a horizontal cut, as discussed with regard to 244-246.

Template 410A is a narrow template with a single image tile. This image tile's type would be Vertical. Template 410B may be created by subdividing a Vertical image tile as shown in template 410A using a horizontal cut, such that the narrower of the two resulting rectangles is on the top, as discussed with regard to 252. Template 410C may be created by subdividing a Vertical image tile as shown in template 410A using a horizontal cut, such that the narrower of the two resulting rectangles is on the bottom, as discussed with regard to 252. Template 410D may be created by subdividing a Vertical image tile as shown in template 410A using two horizontal cuts, as discussed with regard to 254. Template 410E may be created by subdividing a Horizontal image tile at the top as shown in template 410D using a vertical cut, as discussed with regard to 230.

Using the generated templates, the RMG may generate an aesthetically balanced rhythmic image mosaic. For example, the RMG may generate an aesthetically balanced rhythmic image mosaic by repeatedly using sets comprising one of the wide templates 405A-405F followed by one of the narrow templates 410A-410E.

Detailed Description of the RMG Coordinator

Figure 5:
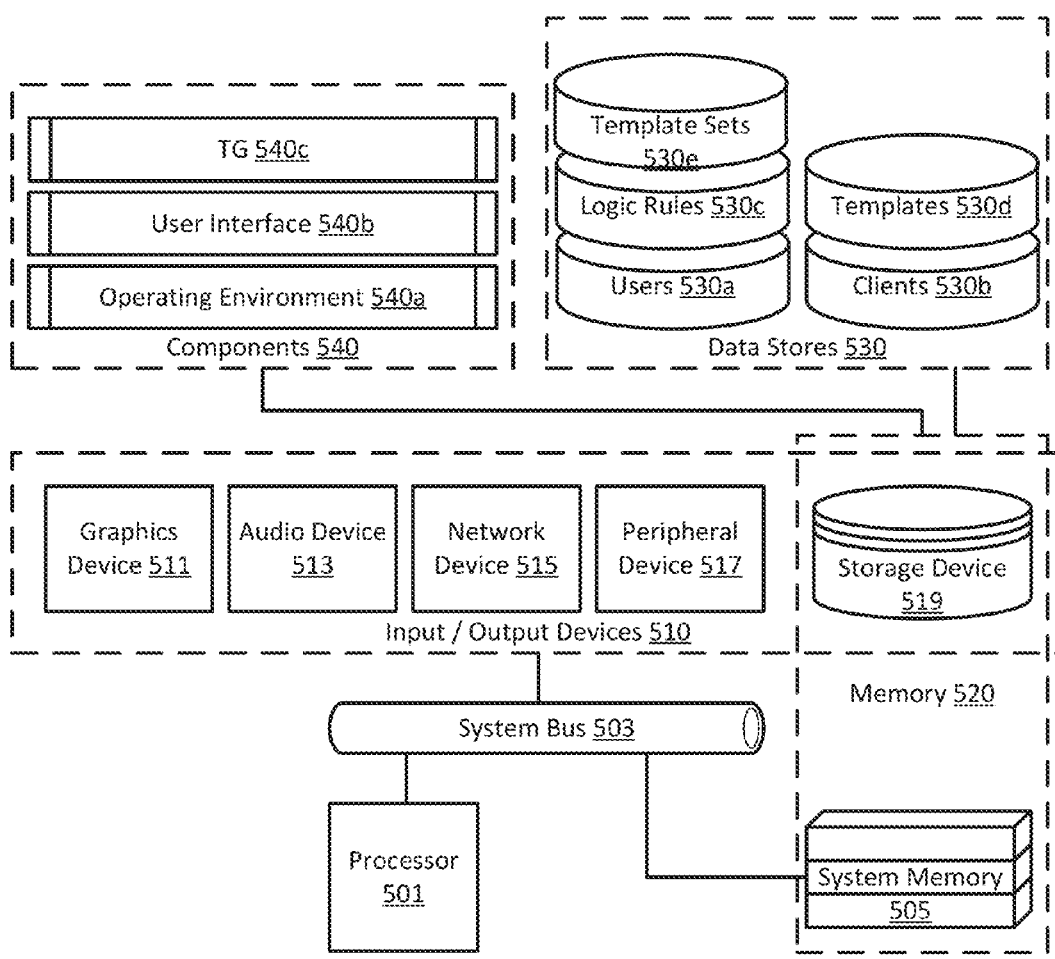
FIG. 5 shows a block diagram illustrating an exemplary RMG coordinator in one embodiment of the RMG.

FIG. 5 shows a block diagram illustrating an exemplary RMG coordinator in one embodiment of the RMG. The RMG coordinator facilitates the operation of the RMG via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the RMG coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the RMG coordinator may comprise a stand-alone computer system, a distributed computer system, a node in a computer network (i.e., a network of computer systems organized in a topology), a network of RMG coordinators, and/or the like. It is to be understood that the RMG coordinator and/or the various RMG coordinator elements (e.g., processor, system bus, memory, input/output devices) may be organized in any number of ways (i.e., using any number and configuration of computer systems, computer networks, nodes, RMG coordinator elements, and/or the like) to facilitate RMG operation. Furthermore, it is to be understood that the various RMG coordinator computer systems, RMG coordinator computer networks, RMG coordinator nodes, RMG coordinator elements, and/or the like may communicate among each other in any number of ways to facilitate RMG operation. As used in this disclosure, the term "user" refers generally to people and/or computer systems that interact with the RMG; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The RMG coordinator includes a processor 501 that executes program instructions (e.g., RMG program instructions). In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 505 via a system bus 503. The system bus may interconnect these and/or other elements of the RMG coordinator via electrical, electronic, optical, wireless, and/or the like communication links (e.g., the system bus may be integrated into a motherboard that interconnects RMG coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions (e.g., RMG program instructions) executed by the processor. The system memory may facilitate accessing, storing, retrieving, modifying, deleting, and/or the like data (e.g., RMG data) by the processor.

In various embodiments, input/output devices 510 may be connected to the processor and/or to the system memory, and/or to one another via the system bus.

In some embodiments, the input/output devices may include one or more graphics devices 511. The processor may make use of the one or more graphic devices in accordance with program instructions (e.g., RMG program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., RMG data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 513. The processor may make use of the one or more audio devices in accordance with program instructions (e.g., RMG program instructions) executed by the processor. In one implementation, an audio device may be a sound card that may obtain (e.g., via a connected microphone), process, output (e.g., via connected speakers), and/or the like audio data (e.g., RMG data). A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 515. The processor may make use of the one or more network devices in accordance with program instructions (e.g., RMG program instructions) executed by the processor. In one implementation, a network device may be a network card that may obtain (e.g., via a Category 5 Ethernet cable), process, output (e.g., via a wireless antenna), and/or the like network data (e.g., RMG data). A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 517. The processor may make use of the one or more peripheral devices in accordance with program instructions (e.g., RMG program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the RMG coordinator with a variety of input, output and processing capabilities.

In some embodiments, the input/output devices may include one or more storage devices 519. The processor may access, read from, write to, store in, erase, modify, and/or the like a storage device in accordance with program instructions (e.g., RMG program instructions) executed by the processor. A storage device may facilitate accessing, storing, retrieving, modifying, deleting, and/or the like data (e.g., RMG data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 505 and the one or more storage devices 519 may be referred to as memory 520 (i.e., physical memory).

RMG memory 520 contains processor-operable (e.g., accessible) RMG data stores 530. Data stores 530 comprise data that may be used (e.g., by the RMG) via the RMG coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, RMG coordinator elements, and/or the like) to facilitate RMG operation. For example, RMG data stores may comprise data stores 530a-e implemented as one or more databases. A users data store 530a may be a collection of database tables that include fields such as UserID, UserName, UserPreferences, UserTemplates, and/or the like. A clients data store 530b may be a collection of database tables that include fields such as ClientID, ClientName, ClientDeviceType, ClientScreenResolution, and/or the like. A logic rules data store 530c may be a collection of database tables that include fields such as LogicRulesSpecification, ParametersSpecification, and/or the like. A templates data store 530d may be a collection of database tables that include fields such as TemplateID, TemplateName, TemplateTiles, and/or the like. A template sets data store 530e may be a collection of database tables that include fields such as TemplateSetID, TemplateSetDimensions, TemplateSetMembers, TemplateSetMembersOrder, and/or the like. The RMG coordinator may use data stores 530 to keep track of inputs, parameters, settings, variables, records, outputs, and/or the like.

RMG memory 520 contains processor-operable (e.g., executable) RMG components 540. Components 540 comprise program components (including program instructions and any associated data stores) that are executed (e.g., by the RMG) via the RMG coordinator (i.e., via the processor) to transform RMG inputs into RMG outputs. It is to be understood that the various components and their subcomponents, capabilities, applications, and/or the like may be organized in any number of ways (i.e., using any number and configuration of components, subcomponents, capabilities, applications, RMG coordinator elements, and/or the like) to facilitate RMG operation. Furthermore, it is to be understood that the various components and their subcomponents, capabilities, applications, and/or the like may communicate among each other in any number of ways to facilitate RMG operation. For example, the various components and their subcomponents, capabilities, applications, and/or the like may be combined, integrated, consolidated, split up, distributed, and/or the like in any number of ways to facilitate RMG operation. In another example, a single or multiple instances of the various components and their subcomponents, capabilities, applications, and/or the like may be instantiated on each of a single RMG coordinator node, across multiple RMG coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 540 may include an operating environment component 540a. The operating environment component may facilitate operation of the RMG via various subcomponents.

In some implementations, the operating environment component may include an operating system subcomponents. The operating system subcomponents may provide an abstraction layer that facilitates the use of, communication among, common services for, interaction with, security of, and/or the like of various RMG coordinator elements, components, data stores, and/or the like.

In some embodiments, the operating system subcomponents may facilitate execution of program instructions (e.g., RMG program instructions) by the processor by providing process management capabilities. For example, the operating system subcomponents may facilitate the use of multiple processors, the execution of multiple processes, multitasking, and/or the like.

In some embodiments, the operating system subcomponents may facilitate the use of memory by the RMG. For example, the operating system subcomponents may allocate and/or free memory, facilitate memory addressing, provide memory segmentation and/or protection, provide virtual memory capability, facilitate caching, and/or the like. In another example, the operating system subcomponents may include a file system (e.g., File Allocation Table (FAT), New Technology File System (NETS), Hierarchical File System Plus (HAS+), Universal Disk Format (UHF), Linear Tape File System (LETS)) to facilitate storage, retrieval, deletion, aggregation, processing, generation, and/or the like of data.

In some embodiments, the operating system subcomponents may facilitate operation of and/or processing of data for and/or from input/output devices. For example, the operating system subcomponents may include one or more device drivers, interrupt handlers, file systems, and/or the like that allow interaction with input/output devices.

In some embodiments, the operating system subcomponents may facilitate operation of the RMG coordinator as a node in a computer network by providing support for one or more communications protocols. For example, the operating system subcomponents may include support for the Internet protocol suite (i.e., Transmission Control Protocol/Internet Protocol (TAP/TIP)) of network protocols such as TAP, TIP, User Data gram Protocol (UP), Mobile TIP, and/or the like. In another example, the operating system subcomponents may include support for security protocols (e.g., Wired Equivalent Privacy (WEEP), Wi-Fi Protected Access (PA), PA2) for wireless computer networks. In yet another example, the operating system subcomponents may include support for virtual private networks (VANS).

In some embodiments, the operating system subcomponents may facilitate security of the RMG coordinator. For example, the operating system subcomponents may provide services such as authentication, authorization, audit, network intrusion-detection capabilities, firewall capabilities, anti virus capabilities, and/or the like.

In some embodiments, the operating system subcomponents may facilitate user interaction with the RMG by providing user interface elements that may be used by the RMG to generate a user interface. In one implementation, such user interface elements may include widgets (e.g., windows, dialog boxes, scroll bars, menu bars, tabs, ribbons, menus, buttons, text boxes, checkboxes, combo boxes, drop-down lists, list boxes, radio buttons, sliders, spinners, grids, labels, progress indicators, icons, tool tips, and/or the like) that may be used to obtain input from and/or provide output to the user. For example, such widgets may be used via a widgets toolkits such as Microsoft Foundation Classes (MAC), Apple Cocoa Touch, Java Swing, GTX+, Qt, Yahoo! User Interface Library (XI), and/or the like. In another implementation, such user interface elements may include sounds (e.g., event notification sounds stored in MPG3 file format), animations, vibrations, and/or the like that may be used to inform the user regarding occurrence of various events. For example, the operating system subcomponents may include a user interface such as Windows Zero, Mac OS X Aqua, GNOME Shell, kDa Plasma Workspaces (e.g., Plasma Desktop, Plasma Netbook, Plasma Contour, Plasma Mobile), and/or the like.

In various embodiments the operating system subcomponents may comprise a single-user operating system, a multi-user operating system, a single-tasking operating system, a multitasking operating system, a single-processor operating system, a multi processor operating system, a distributed operating system, an embedded operating system, a real-time operating system, and/or the like. For example, the operating system subcomponents may comprise an operating system such as UNIX, LINE, IBM i, Sun Solariums, Microsoft Windows Server, Microsoft DOS, Microsoft Windows 7, Apple Mac OS X, Apple IONS, Android, Syrian, Windows Phone 7, Blackberry QNX, and/or the like.

In some implementations, the operating environment component may include a database subcomponents. The database subcomponents may facilitate RMG capabilities such as storage, analysis, retrieval, access, modification, deletion, aggregation, generation, and/or the like of data (e.g., the use of data stores 530). The database subcomponents may make use of database languages (e.g., Structured Query Language (SQL), XQuery), stored procedures, triggers, APIs, and/or the like to provide these capabilities. In various embodiments the database subcomponents may comprise a cloud database, a data warehouse, a distributed database, an embedded database, a parallel database, a real-time database, and/or the like. For example, the database subcomponents may comprise a database such as Microsoft SQL Server, Microsoft Access, MySQL, IBM DB2, Oracle Database, and/or the like.

In some implementations, the operating environment component may include an information handling subcomponents. The information handling subcomponents may provide the RMG with capabilities to serve, deliver, upload, obtain, present, download, and/or the like a variety of information. The information handling subcomponents may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponents may facilitate the serving of information to users, RMG components, nodes in a computer network, web browsers, and/or the like. For example, the information handling subcomponents may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponents may communicate with the database subcomponents via standards such as Open Database Connectivity (ODBC), Java Database Connectivity (JDBC), ActiveX Data Objects for .NET (ADO.NET), and/or the like. For example, the information handling subcomponents may use such standards to store, analyze, retrieve, access, modify, delete, aggregate, generate, and/or the like data (e.g., data from data stores 530) via the database subcomponents.

In some embodiments, the information handling subcomponents may facilitate presentation of information obtained from users, RMG components, nodes in a computer network, web servers, and/or the like. For example, the information handling subcomponents may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponents. The messaging subcomponents may facilitate RMG message communications capabilities. The messaging subcomponents may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, and/or the like to facilitate RMG message communications. The messaging subcomponents may facilitate message communications such as email, instant messaging, Voice over TIP (VoIP), video conferencing, Short Message Service (SMS), web chat, and/or the like. For example, the messaging subcomponents may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponents that facilitates RMG security. In some embodiments, the security subcomponents may restrict access to the RMG, to one or more services provided by the RMG, to data associated with the RMG (e.g., stored in data stores 530), to communication messages associated with the RMG, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an TIP address, and/or the like. Various security models such as access-control lists (ACLs), capability-based security, hierarchical protection domains, and/or the like may be used to control access. For example, the security subcomponents may facilitate digital rights management (DRM), network intrusion detection, firewall capabilities, and/or the like.

In some embodiments, the security subcomponents may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the RMG may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponents may comprise a cryptographic system such as Pretty Good Privacy (PGP).

In some implementations, the operating environment component may include a virtualization subcomponents that facilitates RMG virtualization capabilities. In some embodiments, the virtualization subcomponents may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponents may provide support for various other virtualized environments such as via operating-system level virtualization, desktop virtualization, workspace virtualization, mobile virtualization, application virtualization, database virtualization, and/or the like. In some embodiments, the virtualization subcomponents may provide support for various virtualized resources such as via memory virtualization, storage virtualization, data virtualization, network virtualization, and/or the like. For example, the virtualization subcomponents may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solariums 10, Oracle Solariums 11), Informatica Data Services, Wine, and/or the like.

In some embodiments, components 540 may include a user interface component 540b. The user interface component may facilitate user interaction with the RMG by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponents of the operating environment component. For example, the user interface component may make use of the operating system subcomponents's user interface elements via a widgets toolkits. In some implementations, the user interface component may make use of information presentation capabilities provided by the information handling subcomponents of the operating environment component. For example, the user interface component may make use of a web browser to provide a user interface via HTML5, Adobe Flash, Microsoft Silverlight, and/or the like.

In some embodiments, components 540 may include any of the components TG 540c described in more detail in preceding figures.

The Embodiments of the RMG

The entirety of this disclosure (including the written description, figures, claims, abstract, appendices, and/or the like) for RHYTHMIC MOSAIC GENERATION METHODS, APPARATUSES AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the RMG coordinator, RMG coordinator elements, RMG data stores, RMG components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the RMG coordinator, RMG coordinator elements, RMG data stores, RMG components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the RMG discussed in this disclosure have been directed to generating rectangular templates for photo mosaics, the innovations described in this disclosure may be readily applied to a wide variety of other fields and/or applications.

The following is claimed:

1. A processor-implemented method to facilitate template generation for a scrollable image mosaic, comprising:
   receiving via a processor a request to generate templates for a template set;
   receiving user inputs for a selected number of image tiles and an aspect ratio for a template set member;
   selecting via the processor a template set member from the template set;
   determining via the processor dimensions of the template set member based on an initial cut; and
   generating a rhythmic scrollable image mosaic templates having the user-selected number of image tiles for the template set member, the generating including:
      selecting an image tile of a template to be generated;
      determining a tile type associated with the image tile; and
      subdividing the image tile in accordance with the type, aspect ratio and initial cut.

2. The method of claim 1, wherein the generating further comprises:
   (b) confirming that the image tile may be subdivided.

3. The method of claim 2, wherein the tile type is one of Horizontal, Square, and Vertical.

4. The method of claim 2, wherein the selected image tile is randomly selected.

5. The method of claim 2, wherein the selected image tile is the biggest or the smallest image tile of the template.

6. The method of claim 2, wherein the selected image tile is the topmost or the bottommost image tile of the template.

7. The method of claim 2, wherein the confirming includes verifying that the template would have a focal picture after the image tile is subdivided.

8. The method of claim 2, wherein the confirming includes verifying that the image tile's aspect ratio substantially corresponds to one of allowed aspect ratios.

9. The method of claim 2, wherein the confirming includes verifying that the image tile's size is at least a minimum specified size.

10. The method of claim 2, wherein the image tile is subdivided using at least one horizontal cut.

11. The method of claim 2, wherein the image tile is subdivided using at least one vertical cut.

12. The method of claim 2, wherein the image tile is subdivided using at least one vertical cut and at least one horizontal cut.

13. The method of claim 2, wherein the image tile is subdivided in accordance with emphasis specification.

14. The method of claim 2, wherein the image tile is subdivided in such a way as to avoid creating a duplicate template.

15. The method of claim 1, wherein:
   the template set comprises a wide template set member and a narrow template set member; and
   the initial cut is such that the width of the wide template set member substantially corresponds to 62% of the template set width and the width of the narrow template set member substantially corresponds to 38% of the template set width.

16. The method of claim 1, further comprising generating an image mosaic by repeatedly using the generated templates in accordance with the template set setup.

17. The method of claim 16, wherein dimensions of the template set are such that the template set is larger than the screen size of a client device, on which the image mosaic is to be viewed, by a predetermined amount.

18. The method of claim 1, wherein the desired number of image tiles for the template set member is a plurality of desired numbers between a minimum number and a maximum number.

19. A template generating apparatus for a scrollable image mosaic, comprising:
   a memory;
   a processor in communication with the memory, and configured to issue a plurality of processing instructions stored in the memory, wherein the processor issues instructions to:
   receive a request to generate templates for a template set;
   receive user inputs for a selected number of image tiles and an aspect ratio for a template set member;
   select a template set member from the template set;
   determine dimensions of the template set member based on an initial cut;
   identify a desired number of image tiles for the template set member; and
   generate a rhythmic scrollable image mosaic templates having the user-selected number of image tiles for the template set member by:
      selecting an image tile of a template to be generated;
      determining a tile type associated with the image tile; and
      subdividing the image tile in accordance with the type, aspect ratio and initial cut.

20. A scrollable image mosaic template generating processor-readable non-transitory physical medium storing processor-issuable instructions to:
   receive a request to generate templates for a template set;
   receive user inputs for a selected number of image tiles and an aspect ratio for a template set member;
   select a template set member from the template set;

determine dimensions of the template set member based on an initial cut;
identify a desired number of image tiles for the template set member; and
generate rhythmic scrollable image mosaic templates having the user-selected number of image tiles for the template set member by:
  selecting an image tile of a template to be generated;
  determining a tile type associated with the image tile; and
  subdividing the image tile in accordance with the type, aspect ratio and initial cut.

* * * * *